Figure 1:
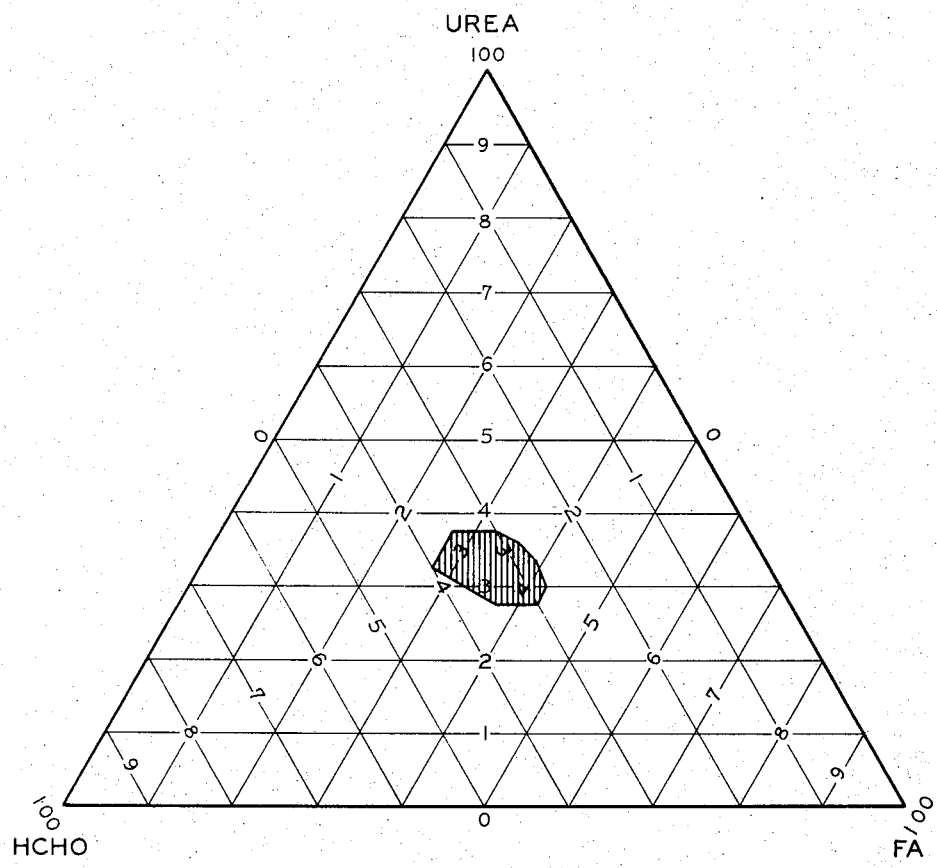

Dec. 26, 1967     I. H. TSOU     3,360,492
MOLDING COMPOSITION COMPRISING A REFRACTORY MATERIAL AND
AS A BINDER THE REACTION PRODUCT OF
FORMALDEHYDE, FURFURYL
ALCOHOL AND A UREA

Filed Aug. 5, 1964     2 Sheets-Sheet 1

IVAN H. TSOU
INVENTOR

BY John R. Faulkner
Elvin B. Johnson
ATTORNEYS

United States Patent Office 3,360,492
Patented Dec. 26, 1967

3,360,492
MOLDING COMPOSITION COMPRISING A REFRACTORY MATERIAL AND AS A BINDER THE REACTION PRODUCT OF FORMALDEHYDE, FURFURYL ALCOHOL AND A UREA
Ivan H. Tsou, Allen Park, Mich., assignor to Ford Motor Company, Dearborn, Mich., a corporation of Delaware
Filed Aug. 5, 1964, Ser. No. 387,749
11 Claims. (Cl. 260—29.4)

This invention relates to the art of founding. In particular, this invention relates to a new and improved molding composition for use in the preparation of metal defining structures. More particularly, this invention is concerned with a molding composition comprising a major amount of particulate or granular refractory material and a minor amount of an aqueous, thermosetting adhesive composition, with a method for preparing casting forms therewith and with casting forms prepared therefrom.

As is well known, the shell molding process involves the formation and use of thin-walled dispensable foundry molds and cores composed of sand or other particulate solids and resinous binders. For purposes of simplicity, the term "mold" is hereinafter used in its generic sense, i.e. to mean a casting form which includes both molds and cores. Such molds are commonly prepared by admixing a minor proportion of a thermosetting resin and a suitable polymerization catalyst with sand and bringing the resulting molding mixture into contact with a heated metal pattern for a short period of time. Exact curing times and temperatures must be experimentally determined in each instance, however, the pattern temperature is ordinarily in the range of about 350° F. to about 600° F., most commonly between 400° and 450° F., with contact between pattern and molding mixture limited to a time in the range of a few seconds to about one minute. The heat acquired by the molding mixture through contact with the pattern causes the curing process to continue after such contact is terminated. Where such retained heat is insufficient to complete the cure, as, for example, with exceptionally thick cores, a postmold curing step is provided wherein the mold is subjected to a second source of heat as in a baking oven. The term "pattern" is used herein to include both mold patterns and core boxes. Application of the molding mixture to the heated pattern is effected by one of a variety of conventional foundry techniques such as "dumping" and "blowing." These methods need not be further elaborated upon here as they are well known in the art and have been described at great length in the literature.

The resin system or binder used in preparing the dispensable molds must be of such composition that it will bind the grains of sand into a rigid structure of high tensile strength which has smooth, gas permeable surfaces satisfactory for use in the intended casting operation. The effectiveness of a binder is not only a matter of its adhesiveness and strength but also of its distribution. It is advantageous to employ a resin composition that can be readily and evenly distributed upon a high percentage of the sand surfaces. It is also advantageous to have the resin and catalyst be of such composition that when both are mixed with sand the binder mix is capable of standing for prolonged periods of time, e.g. overnight, without the resin undergoing significant polymerization. By significant polymerization is meant polymerization sufficient to cause blocking of conventional transfer conduits through which the sand mix is transported from the mixing zone to the molding zone and/or sufficient to interfere with or adversely affect the intended mold forming process by which the sand mix is applied to the heated pattern, e.g. core blowing. Further, the composition of the resin-catalyst system should be such that in use it does not yield up significant amounts of fumes or gaseous products which are deleterious to the comfort and safety of foundry personnel.

Resins containing one or more polymerizable components selected from liquid furane derivatives, e.g. furfuryl alcohol; organic nitrogenous compounds such as polyfunctional amines and amides, e.g. urea; and formaldehyde or formaldehyde yielding compounds, e.g. paraformaldehyde, have found significant use in shell molding and other founding operations. For example, the use of furfuryl alcohol-urea-formaldehyde resins is disclosed in U.S. Patents 3,059,297 and 3,008,205; the use of urea with furfuryl alcohol in U.S. Patents 3,020,609 and 2,999,829; and liquid furane derivatives in U.S. Patent 2,345,966. The resins employed in the molding compositions of this invention are thermosetting resins which utilize such components.

The accompanying drawings are triangular coordinate graphs showing the relative concentrations of the formaldehyde, urea and furfuryl alcohol components within the resin-catalyst system employed in the molding compositions of this invention.

Figure 2:
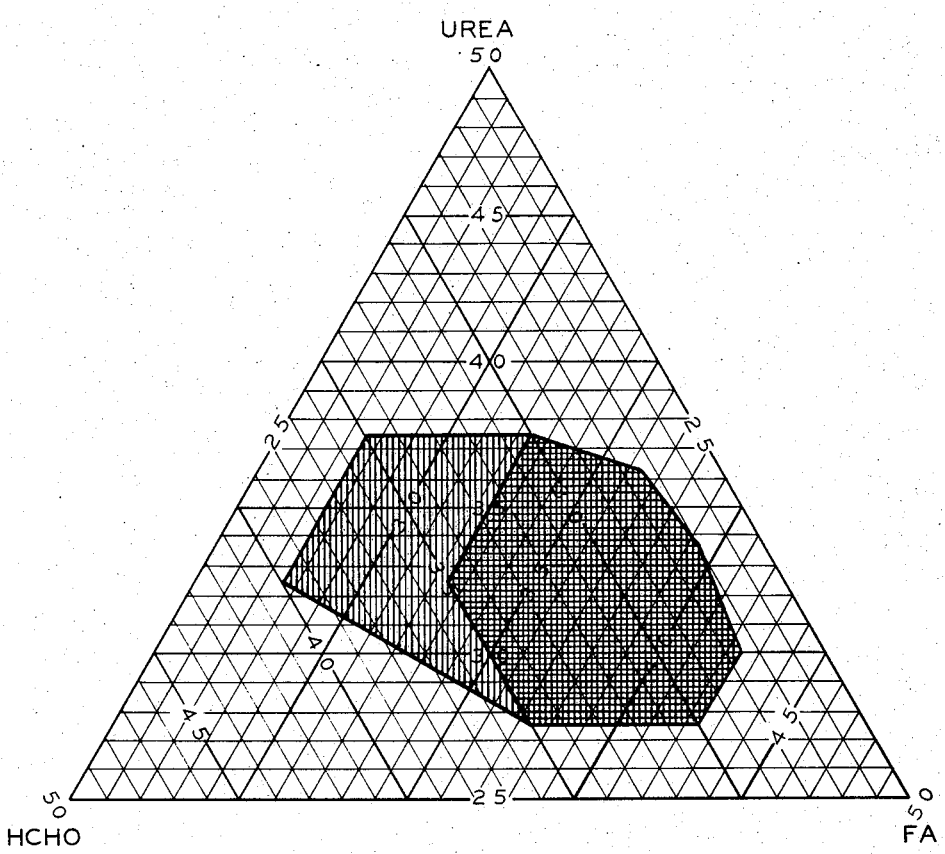

FIGURE 1 is a triaxial diagram indicating within a hatched area therein relative concentration for the three principal organic components of the resin-catalyst system; and FIGURE 2 is a triaxial diagram representing an enlarged view of the area encompassing the hatched area of FIGURE 1 and illustrating by means of a double hatched area relative concentrations of such components particularly adaptable for use in hot climates and/or when the room temperature of the mixing and transfer zones is relatively high, i.e. resin-catalyst systems that are particularly resistant to premature "set-up" or "blocking."

A variety of acidic polymerization catalysts have been disclosed in the aforementioned patents and elsewhere in the art for use in effecting a rapid cure of the aforementioned resinous binders upon application of heat. These include mineral acids, aluminum chloride, zinc chloride, ferric chloride, sulfur chloride, ferrous chloride, ammonium chloride, phosphorus pentoxide, polycarboxylic organic acids and anhydrides, mineral acid salts of urea, thiourea, substituted ureas such as methyl urea, acetyl urea, benzoyl urea, phenyl thiourea, asymmetrical diethyl urea, allyl urea, 2-chloroallyl urea, ethylidene urea, methylol urea, etc.; and mineral acid salts of other members of the urea system, e.g. guanidine ininourea, dicyandiamide, guanyl urea, biguanidine, aminoguanidine, aminotriazole, creatine, creatinine, guanoline, ethylene pseudo-sulfocarbamide derivatives, triazine derivatives, etc.; and mineral acid salts of ethanol amines such as mono- di- and tri- ethanolamines, triisopropanolamine phenyl ethanolamine, ethyl phenyl ethanolamine, phenyl diethanolamine, diethylaminoethanol, ethylene diamine, diethylene triamine, triethylene tetramine, alkyl amines such as methyl amine, trimethyl amine, ethyl amine, propyl amine, etc.; aryl amines such as aniline, benzyl amine, etc.; acetoacetanilide, orthochloroacetoacentanilide, dichloroacetoacetanilide, morpholine, phenyl morpholine, etc.

It is one object of this invention to provide a rapid curing molding composition which will produce shell molds of superior strength upon exposure to conventional resin curing temperatures.

It is another object of this invention to provide a molding composition containing an acid containing catalyst and an essentially neutral thermosetting resin which cures rapidly in the presence of conventional resin curing temperatures but exhibits significant resistance to polymerization in a sand mix with an acid containing catalyst at room temperature.

It is another object of this invention to provide a molding composition containing a neutral or basic catalyst solution capable of readily yielding an acidic polymerization catalyst upon application of conventional resin curing temperatures.

It is another object of this invention to provide an improving molding composition which includes a non-volatile and effective polymerization catalyst for mold binder resins and especially the resins disclosed herein.

It is another object of this invention to provide an improved molding composition which includes an effective aqueous polymerization catalyst for mold binder resins capable of withstanding prolonged exposure to low temperatures without significant loss of effectiveness.

It is another object of this invention to provide an improved molding composition which includes a resin-catalyst system which when admixed with sand provides shell molds of superior strength and is capable of standing in admixture with sand for prolonged periods of time at room temperature without undergoing significant polymerization.

It is still another object of this invention to provide an improved molding composition which includes a resin-catalyst system which is capable of undergoing conventional resin curing temperatures without yielding up significant quantities of fumes or gaseous products which are deleterious to the comfort and health of foundry personnel.

The above and other objects of this invention will become more apparent from the following detailed description.

The liquid binder resins of the molding composition of this invention include a liquid furane derivative, an organic nitrogeneous compound such as a polyfunctional amine or amide, and formaldehyde.

Furfuryl alcohol is the preferred member of this group because of its cost and availability as well as its chemical and physical properties. It is known in the art, however, that other polymerizable liquid furane derivatives, although not equivalents, may be substituted for furfuryl alcohol. See, for example, U.S. Patent 2,345,966. Illustrative examples of such furane derivatives are the alkyl furane alcohols, e.g. the methyl furfuryl alcohols, etc.; the halofurfuryl alcohols, e.g. the chloro-, bromo-, and fluoro-furfuryl alcohols and homologous alcohols, etc.; the furfuryl aldehydes, e.g. furfuryl acrolein, etc.; the halofurfurals, e.g. the chloro-, bromo-, and fluoro-furane aldehydes, etc.; the furfuryl ketones, e.g. furfuryl acetone, etc.; the furfuryl acetals and hemiacetals, e.g. furfuryl formal, furfuryl propional, furfuryl furfurals, etc.; and mixtures of the same.

Urea is the preferred organic nitrogeneous component. It is particularly suitable for this use and is available in quantity at moderate cost. Other polyfunctional and polymerizable amines and amides, although not equivalents, can be substituted for urea. These include, but not by way of limitation, the nitrogen-containing organic compounds hereinbefore listed in connection with polymerization catalysts.

In the molding compositions which constitute one embodiment of this invention the relative concentrations of the urea, formaldehyde and furfuryl alcohol components within the combined resin-catalyst system are maintained within defined limits illustrated by the hatched areas of FIGURES 1 and 2 of the accompanying drawings. In a preferred embodiment the concentration of furfuryl alcohol in the resin and in the resin-catalyst system is in excess of that of either the urea component or the formaldehyde component but less than that of their sum.

In a preferred embodiment the binder resin is applied to the mold sand as an aqueous product as is the catalyst. Aside from the aforementioned urea, formaldehyde and furfuryl alcohol components, the balance of the resin composition is made up of water and other additives hereinafter discussed in detail. The furfuryl alcohol, urea and formaldehyde components within the binder are at least in a partially polymerized form when admixed with the sand.

In accordance with this invention the aqueous catalyst-containing materials are each rendered essentially neutral or slightly basic by the addition of a neutralizing amount of a suitable basic material prior to admixture with sand or other particulate refractory foundry material. Such basic material is preferably one or more compounds which in conjunction with other materials within the binder and/or catalyst has the effect of establishing one or more buffer systems therein.

In one preferred embodiment there is added to the resin-catalyst system a small amount of a surface active agent wherein the lipophilic group or groups predominate in relation to the hydrophilic group or groups, i.e. an organic compound having at least one component or functional group that has an affinity for an aqueous medium and renders the compound at least partially soluble in the aqueous catalyst solution and/or the water added to the composition with the partially polymerized resin together with one or more components or functional groups which are antipathetic to the aqueous medium, i.e., which tend to be expelled by it. Since the chemical composition of surface active agents can vary widely, limitations on suitable surface active agents for a particular use are realistically defined only in functional terms.

Sorbitan trioleate is one example of a surface active agent that is particularly suitable for this use. The surface active agent is preferably added in an amount such as to comprise about 0.1 to about 3, more preferably about 0.5 to about 1.5, weight percent of the aqueous binder material.

In one embodiment there is added to a catalyst-containing aqueous solution a small amount of a water dissociable calcium comprising compound, preferably calcium chloride. This material is preferably about 0.5 to about 1.5, weight percent of the catalyst solution.

Certain organic materials are also advantageously employed as catalyst additives in amounts preferably in the range of about 0.001 to about 0.1 weight percent of the catalyst solution. In one such embodiment the additive is an organic dye, e.g. Congo red, Ponceau blue, etc. In another such embodiment the additive is a polysaccharide, e.g. agar, dextrin, etc. In still another embodiment this additive is a soluble protein, e.g. albumins, globulins, glutelins, etc.

Within the defined concentration ranges for the three principal ingredients of the resin the viscosity of the resulting resin may be controlled, as for instance, by adjusting the urea and formaldehyde concentrations, as an increase in urea concentration provides an increase in viscosity. When first prepared the viscosity of the resin may range upward from about 50 centipoises, Brookfield Viscometer. With a high grade of molding sand, i.e. one in which a high percentage of the grains are substantially rounded, it has been found advantageous to employ a resin which has a viscosity above about 50 and below about 600 centipoises, commonly 200 to 500 centipoises. Resins having a viscosity in the range of about 600 to 1400 centipoises are prepared in accordance with this invention for use where the employment of resins of higher viscosity is required or is advantageous. Formaldehyde-urea-furfuryl alcohol resins have a tendency to increase in viscosity with time in storage.

In use the sand is preferably admixed thoroughly with the aqueous catalyst material prior to addition of the resin. This minimizes the agitation required for a thorough mixing of the resin and sand and thus minimizes the temperature rise which can result from such agitation. The sand-resin mix is then ready for application to the heated pattern in accordance with conventional foundry practices.

The resin-catalyst combination will ordinarily be employed at a rate of about 1.7 to about 3.5 parts by weight per 100 parts of sand. Commonly the resin will be employed at a rate of about 1.9–2.5 parts by weight per 100 parts of sand with the catalyst solution employed at a rate of about 17 to 30 parts by weight per 100 parts of resin. On a water-free basis the combined urea, formaldehyde and furfuryl alcohol components of the resin-catalyst combination comprise at least about 95 weight percent of such combination.

The terms "refractory material" and "refractory foundry material" as used herein refer to conventional refractory foundry materials which are exemplified by aluminum, silicas and clays.

This invention will be more fully understood from the following examples which are given by way of illustration and not by way of limitation:

*Example I*

A liquid core binder material was prepared in the following manner:

Step (1).—To a stainless steel kettle were charged

|   | Lbs. |
|---|---|
| Urea-formaldehyde concentrate [1] | 4106 |
| Furfuryl alcohol | 3283 |
| Urea with agitation until clear (app. 1.5 hours) | 799 |

[1] A commercially available concentrate having the following composition:

| | |
|---|---|
| Formaldehyde, percent | 60 |
| Urea, percent | 25 |
| Active raw materials, percent | 85 |
| Formaldehyde : urea mol ratio | 4.8 : 1 |
| Color APHA (max.) | 10 |
| Turbidity, Hellige (max.) | 10 |
| pH, at 25° C. (77°) (approx.) | 8 |
| Viscosity at 25° C. (77° F.) cps. (max.) | 300 |
| Ash, percent (max.) | 1.2 |
| Buffer capacity, ml. 0.5 N reagent, pH 2–9 (max.) | 15 |
| Free formic acid | None |
| Methanol, percent (max.) | 0.3 |

(2) Acetic acid was added to the solution formed in the preceding step until the pH thereof was adjusted to about 5.6–5.7 (about 8.6 lbs.).

(3) The solution of the preceding step was heated to 203° F. and held at this temperature for 2 hours.

(4) The product of the preceding step was allowed to cool to below about 185° F. in a mixing tank.

(5) To the product of the preceding step were added 83 lbs. of sorbitan trioleate with agitation.

(6) Triethanolamine was added to the product of the preceding step until the pH thereof was adjusted to a pH of about 6.9–7.1 (about 20.4 lbs.). The viscosity of the resulting liquid measured about 350 centipoises.

The relative concentrations of the components of the binder solution thus prepared, hereinafter termed R-1, were essentially as follows:

|   | Lbs. | Percent of Total Weight |
|---|---|---|
| Urea | 1,824 | 21.99 |
| HCHO | 2,460 | 29.65 |
| E₂O | 615 | 7.41 |
| Furfuryl alcohol | 3,283 | 39.57 |
| Acetic acid | 9.1 | 0.11 |
| Sorbitan trioleate | 83 | 1.00 |
| Triethanolamine | 22.4 | 0.27 |
|   | 8,296.5 | 100.00 |

A liquid catalyst for use in curing the resinous materials of the above described core binder was prepared in the following manner:

Step (1).—To a glass kettle were charged

|   | Lbs. |
|---|---|
| Urea | 2717 |
| Muriatic acid [1] | 1099 |

[1] Composition:

| | | |
|---|---|---|
| HCl (min.) | percent | 27.92 |
| H₂SO₄ (max.) | do | 0.2 |
| Gravity at 60° F.: | | |
| Baumé (min.) | degrees | 18 |
| Specific (min.) | | 1.1417 |

(2) The solution of the preceding step was heated slowly raising the temperature incrementally to 259° F. and this temperature was maintained until the pH of the solution reached 7.

(3) The product of the preceding step was transferred immediately to a mixing tank containing 782 lbs. water.

(4) To the contents of the mixing tank was added sufficient water to increase the weight of the total solution to 4600 lbs.

(5) To the product of the preceding step were added 2.3 lbs. of ammonium nitrate with agitation.

Test cores were prepared from sand (46 AFS) and core binder and catalyst in the following manner:

Step (1)—About 10 lbs. sand and about 0.04 lb. of the liquid catalyst of this example were admixed for about one minute.

(2) To the mixture of the preceding step was added about 0.2 lb. of the liquid resin of this example and mixing was continued for another three minutes.

(3) The sand, resin and catalyst were blown into core molds heated to 425° F. under a pressure of about 80 p.s.i. to form test cores having a cross sectional measurement of 1" x 1".

In combination as here employed the relative concentrations of the components of the resin binder and catalyst were as follows:

|   | Weight percent of total |
|---|---|
| Urea | 27.92 |
| HCHO | 24.71 |
| H₂O | 11.85 |
| Furfuryl alcohol | 32.98 |
| Acetic acid | 0.09 |
| Sorbitan trioleate | 0.83 |
| Triethanolamine | 0.23 |
| HCl (100% pure) | 1.38 |
| Ammonium nitrate | 0.008 |
|   | 99.998 |

Test cores thus prepared were left in contact with the heated core box for different time periods. The cores thus obtained were tested for tensile strength and the results compared with control cores prepared in the same manner from the same sand and a commercially available urea-formaldehyde-furfuryl alcohol core binder and a commercially available ammonium chloride catalyst applied in equal amounts under the same conditions of temperature, humidity, etc.

The resin and catalyst of this example were cured without objectionable odors normally incident to resin catalyst systems of this type. The blocking properties of the resin-catalyst combination were checked by admixing sand,

|   | Cure Time (sec.) | | | | | |
|---|---|---|---|---|---|---|
|   | 5 | 10 | 20 | 30 | 40 | 50 |
| Wt. of Test Core, gms | 105.3 | 105.0 | 105.0 | 105.2 | 105.0 | 105.7 |
| Wt. of Control Core, gms | 106.1 | 105.3 | 105.7 | 105.1 | 105.7 | 106.0 |
| Tensile Strength, p.s.i.: | | | | | | |
| Test Core | 273 | 453 | 500 | 517 | 517 | 490 |
| Control | 237 | 447 | 461 | 500 | 467 | 453 | resin, and catalyst in the aforementioned concentrations and leaving the admixture overnight in a closed container at normal room temperature. Examination of this material the following morning revealed no significant change or "setting up" and the material was still in condition for handling, i.e. core blowing, etc.

Further tensile strength tests were conducted with this resin and catalyst in like manner to the foregoing tests except that the weight of the catalyst in relation to the weight of the resin was varied. The results of these tests were as follows:

| Wt. of Catalyst in Relation to Wt. of Resin | Cure Time, sec. (tensile strength, p.s.i.) | | | | | |
| --- | --- | --- | --- | --- | --- | --- |
| | 5 | 10 | 20 | 30 | 40 | 50 |
| 16% | 220 | 443 | 507 | 503 | 493 | 483 |
| 18% | 263 | 457 | 507 | 513 | 500 | 490 |
| 20% | 373 | 520 | 533 | 533 | 530 | 510 |
| 22% | 417 | 523 | 533 | 550 | 540 | 527 |

Further tensile strength tests were conducted with this resin and catalyst in like manner to the foregoing tests except that the temperature of the heated core pattern was varied. Controls were also tested as before. The results of these tests were as follows:

| Cure Temperature | Tensile Strength, p.s.i. | Cure Time (sec.) | | | | | |
| --- | --- | --- | --- | --- | --- | --- | --- |
| | | 5 | 10 | 20 | 30 | 40 | 50 |
| 350° F | Test Core | 87 | 317 | 477 | 483 | 507 | 530 |
| | Control | 50 | 140 | 423 | 443 | 470 | 490 |
| 500° F | Test Core | 377 | 480 | 490 | 510 | 500 | 473 |
| | Control | 300 | 450 | 480 | 503 | 467 | 447 |

Molding structures, i.e. cores, were prepared from sand and the aforecited resin and catalyst and used in the casting of ferrous metal automobile parts. The cores thus prepared were of the highest quality and their employment for this purpose was eminently successful.

*Example II*

A liquid catalyst was prepared as in Example I except that calcium chloride was added to the aqueous solution in an amount such as to constitute one weight percent of the total catalyst.

This catalyst was used to prepare test cores in conjunction with the core binder resin of Example I. Tensile strength tests were made of eighteen of these cores and a like number of controls made with both the resin and catalyst of Example I. The results were as follows:

The catalyst employed in the test cores retained its integrity without crystallization precipitation at temperatures in the range of 0° to 20° F.

*Example III*

Tests in accordance with the compositions and procedures outlined in Example II were carried out employing in lieu of the calcium chloride component Congo red, Ponceau blue, agar and dextrin in amounts of 0.001, 0.01 and 0.1 part by weight per 100 parts by weight of catalyst solution. These catalyst solutions demonstrated stability at low temperatures.

*Example IV*

Tests in accordance with the compositions and procedure outlined in Example I were carried out with the exception that the concentration of sorbitan trioleate in the resin-catalyst system was 0.5, 1.5, 2 and 3 weight percent. The cores thus prepared demonstrated tensile strengths not significantly different from the previously tested compositions containing 1 weight percent of this material.

*Example V*

A liquid catalyst, hereinafter referred to as catalyst "C-1," was prepared from the following materials:

| | Parts by weight |
| --- | --- |
| Urea | 2952.0 |
| HCl (31.45%) | 1301.0 |
| $H_2O$ | 745.0 |
| $NH_4NO_3$ | 2.5 |

The catalyst solution was processed as the catalyst of Example I to a pH of about 8.

| | Cure Time (sec.) | | | | | |
| --- | --- | --- | --- | --- | --- | --- |
| | 5 | 10 | 20 | 30 | 40 | 50 |
| Average Wt. of 3 Test Cores, gms | 106.0 | 107.0 | 106.0 | 107.0 | 106.0 | 106.8 |
| Average Wt. of 3 Control Cores, gms | 106.3 | 107.8 | 106.2 | 107.0 | 106.0 | 106.7 |
| Tensile Strength, psi.: | | | | | | |
| Test Cores | 320 | 500 | 510 | 550 | 620 | 600 |
| | 300 | 470 | 510 | 530 | 590 | 600 |
| | 260 | 450 | 490 | 550 | 550 | 550 |
| Average | 293 | 473 | 503 | 543 | 587 | 583 |
| Control Cores | 210 | 430 | 500 | 570 | 580 | 560 |
| | 300 | 460 | 520 | 520 | 520 | 530 |
| | 210 | 410 | 510 | 520 | 520 | 540 |
| Average | 240 | 433 | 510 | 537 | 540 | 543 |

A series of liquid core binder materials were prepared by the process heretofore discussed for R–1 of Example I.

A liquid core binder material, hereinafter referred to as "R–2," was prepared from the following materials:

| Concentrate of Example I: | Parts by weight |
|---|---|
| Formaldehyde | 874.8 |
| Urea | 364.5 |
| Additional urea | 35.0 |
| Total urea | 399.5 |
| Furfuryl alcohol | 938.0 |
| Acetic acid | 2.6 |
| Triethanolamine | 7.3 |
| Sorbitan trioleate | 24.4 |

This resinous material was processed to a pH of 6.95 and to a viscosity of about 80 centipoises (Brookfield Viscometer at 25° C.). The viscosities hereinafter recited are from the same scale at the same temperature.

Another binder, hereinafter referred to as "R–3," was prepared from the following materials:

| Concentrate of Example I: | Parts by weight |
|---|---|
| Formaldehyde | 874.8 |
| Urea | 364.5 |
| Additional urea | 160.0 |
| Total urea | 524.5 |
| Furfuryl alcohol | 813.0 |
| Acetic acid | 2.6 |
| Triethanolamine | 7.3 |
| Sorbitan trioleate | 24.4 |

This resinous material was processed to a pH of about 7.05 and to a viscosity of about 200 centipoises.

Another binder, hereinafter referred to as "R–4," was prepared from the following materials:

| Concentrate of Example I: | Parts by weight |
|---|---|
| Formaldehyde | 750.0 |
| Urea | 312.5 |
| Additional urea | 337.0 |
| Total urea | 649.5 |
| Furfuryl alcohol | 813.0 |
| Acetic acid | 2.1 |
| Triethanolamine | 5.0 |
| Sorbitan trioleate | 24.0 |

This resinous material was processed to a pH of about 6.95 and to a viscosity of about 590 centipoises.

Another binder, hereinafter referred to as "R–5," was prepared from the following materials:

| Concentrate of Example I: | Parts by weight |
|---|---|
| Formaldehyde | 750.0 |
| Urea | 312.5 |
| Additional urea | 337.0 |
| Total urea | 399.5 |
| Furfuryl alcohol | 1063.0 |
| Acetic acid | 2.1 |
| Triethanolamine | 5.6 |
| Sorbitan trioleate | 24.0 |

This resinous material was processed to a pH of about 7.05 and to a viscosity of about 60 centipoises.

Another binder, hereinafter referred to as "R–6," was prepared from the following materials:

| Concentrate of Example I: | Parts by weight |
|---|---|
| Formaldehyde | 812.4 |
| Urea | 338.5 |
| Additional urea | 186.0 |
| Total urea | 524.5 |
| Furfuryl alcohol | 875.0 |
| Acetic acid | 2.1 |
| Triethanolamine | 5.6 |
| Sorbitan trioleate | 24.0 |

This resinous material was processed to a pH of about 7.1 and to a viscosity of about 230 centipoises.

Another binder, hereinafter referred to as "R–7," was prepared from the following materials:

| Concentrate of Example I: | Parts by weight |
|---|---|
| Formaldehyde | 750.0 |
| Urea | 312.5 |
| Additional urea | 275.0 |
| Total urea | 587.5 |
| Furfuryl alcohol | 875.0 |
| Acetic acid | 2.1 |
| Triethanolamine | 5.6 |
| Sorbitan trioleate | 24.0 |

This resinous material was processed to a pH of about 7 and to a viscosity of about 350 centipoises.

Another binder, hereinafter referred to as "R–8," was prepared from the following materials:

| Concentrate of Example I: | Parts by weight |
|---|---|
| Formaldehyde | 1125.00 |
| Urea | 468.75 |
| Additional urea | 86.00 |
| Total urea | 554.75 |
| Furfuryl alcohol | 975.00 |
| Acetic acid | 3.10 |
| Triethanolamine | 6.00 |
| Sorbitan trioleate | 29.00 |

This resinous material was processed to a pH of about 7 and to a viscosity of about 150 centipoises.

Another binder, hereinafter referred to as "R–9," was prepared from the following materials:

| Concentrate of Example I: | Parts by weight |
|---|---|
| Formaldehyde | 1000.20 |
| Urea | 416.75 |
| Additional urea | 108.00 |
| Total urea | 524.75 |
| Furfuryl alcohol | 688.00 |
| Acetic acid | 2.10 |
| Triethanolamine | 5.60 |
| Sorbitan trioleate | 25.00 |

This resinous material was processed to a pH of about 7.05.

Another binder, hereinafter referred to as "R–10," was prepared from the following materials:

| Concentrate of Example I: | Parts by weight |
|---|---|
| Formaldehyde | 874.8 |
| Urea | 364.5 |
| Additional urea | 285.0 |
| Total urea | 649.5 |
| Furfuryl alcohol | 688.0 |
| Acetic acid | 2.1 |
| Triethanolamine | 5.6 |
| Sorbitan trioleate | 24.0 |

This resinous material was processed to a pH of about 7.05.

Another binder, hereinafter referred to as "R-11," was prepared from the following materials:

Concentrate of Example I:  Parts by weight
  Formaldehyde _____ 825.0

Urea _____ 343.75
Additional urea _____ 211.00

Total urea _____ 554.75

Furfuryl alcohol _____ 1275.00
Acetic acid _____ 2.5
Triethanolamine _____ 6.6
Sorbitan trioleate _____ 29.0

This resinous material was processed to a pH of about 7 and to a viscosity of about 125 centipoises.

Another binder, hereinafter referred to as "R-12," was prepared from the following materials:

Concentrate of Example I:  Parts by weight
  Formaldehyde _____ 975.00

Urea _____ 406.25
Additional urea _____ 261.00

Total urea _____ 667.25

Furfuryl alcohol _____ 1013.00
Acetic acid _____ 2.60
Triethanolamine _____ 6.80
Sorbitan trioleate _____ 29.00

This resin was processed to a pH of about 7 and to a viscosity of about 325 centipoises.

Test cores 1″ x 1″ were prepared and tested for tensile strength as in Example I using catalyst C-1, binders R-2 through R-12 and sand (AFS 46). The resin was employed in an amount equal to 2 weight percent of the sand. The catalyst was employed in an amount equal to 20 weight percent of the resin. The cores were blown at 80 p.s.i. into patterns heated to 425° F. In order that variables in test conditions, e.g. mixing temperature, humidity, chemical variance in sand etc., be brought into proper perspective a control was run at the same time using binder R-1 of Example I which previously had undergone comparative testing with conventional foundry resins and catalysts. The results from these tests were as follows:

| Resin No. | | Curing Time, (sec.) | | | | | |
|---|---|---|---|---|---|---|---|
| | | 5 | 10 | 20 | 30 | 40 | 50 |
| R-2 | Avg. Wt. 3 Cores, gms | 108.2 | 108.6 | 108.0 | 108.5 | 108.0 | 108.6 |
| | Tensile strength, p.s.i. | 280 | 420 | 560 | 560 | 500 | 500 |
| | | 290 | 410 | 580 | 520 | 500 | 500 |
| | | 280 | 410 | 500 | 500 | 480 | 510 |
| | Average | 283 | 413 | 547 | 527 | 493 | 503 |
| R-3 | Avg. Wt. 3 Cores, gms | 106.7 | 107.0 | 106.2 | 106.8 | 106.0 | 107.2 |
| | Tensile strength, p.s.i. | 350 | 450 | 530 | 550 | 540 | 500 |
| | | 400 | 500 | 550 | 550 | 520 | 510 |
| | | 390 | 480 | 520 | 530 | 500 | 480 |
| | Average | 380 | 477 | 533 | 543 | 520 | 497 |
| R-4 | Avg. Wt. 3 Cores, gms | 105.5 | 106.5 | 105.3 | 106.2 | 105.2 | 106.0 |
| | Tensile strength, p.s.i. | 160 | 400 | 500 | 580 | 550 | 500 |
| | | 150 | 450 | 480 | 510 | 500 | 490 |
| | | 120 | 400 | 490 | 500 | 500 | 500 |
| | Average | 143 | 417 | 490 | 530 | 517 | 497 |
| R-5 | Avg. Wt. 3 Cores, gms | 108.2 | 109.0 | 108.0 | 108.8 | 108.1 | 108.7 |
| | Tensile strength, p.s.i. | 290 | 440 | 520 | 530 | 550 | 500 |
| | | 320 | 430 | 500 | 530 | 600 | 510 |
| | | 320 | 430 | 500 | 580 | 550 | 520 |
| | Average | 310 | 433 | 507 | 547 | 567 | 510 |
| R-6 | Avg. Wt. 3 Cores, gms | 106.4 | 106.7 | 106.2 | 106.9 | 106.5 | 107.0 |
| | Tensile strength, p.s.i. | 390 | 490 | 550 | 530 | 580 | 540 |
| | | 420 | 490 | 550 | 540 | 500 | 460 |
| | | 370 | 450 | 500 | 540 | 500 | 500 |
| | Average | 393 | 477 | 533 | 537 | 527 | 500 |
| R-7 | Avg. Wt. 3 Cores, gms | 105.2 | 106.3 | 105.1 | 106.0 | 105.5 | 106.4 |
| | Tensile strength, p.s.i. | 240 | 440 | 500 | 530 | 500 | 520 |
| | | 300 | 440 | 490 | 520 | 520 | 480 |
| | | 240 | 400 | 480 | 500 | 510 | 460 |
| | Average | 260 | 427 | 490 | 517 | 510 | 487 |
| R-8 | Avg. Wt. 3 Cores, gms | 107.3 | 107.8 | 107.4 | 107.9 | 107.4 | 108.0 |
| | Tensile strength, p.s.i. | 430 | 510 | 530 | 560 | 520 | 520 |
| | | 430 | 530 | 540 | 540 | 520 | 500 |
| | | 430 | 460 | 500 | 500 | 500 | 480 |
| | Average | 430 | 500 | 523 | 533 | 513 | 500 |
| R-9 | Avg. Wt. 3 Cores, gms | 106.8 | 107.5 | 107.2 | 107.6 | 107.3 | 107.9 |
| | Tensile strength, p.s.i. | 450 | 520 | 540 | 520 | 500 | 500 |
| | | 470 | 510 | 520 | 520 | 500 | 470 |
| | | 430 | 500 | 500 | 500 | 500 | 480 |
| | Average | 450 | 510 | 520 | 513 | 500 | 483 |
| R-10 | Avg. Wt. 3 Cores, gms | 105.0 | 105.7 | 105.1 | 106.0 | 105.3 | 106.1 |
| | Tensile strength, p.s.i. | 400 | 470 | 500 | 460 | 450 | 420 |
| | | 400 | 450 | 460 | 460 | 410 | 400 |
| | | 370 | 440 | 450 | 430 | 400 | 415 |
| | Average | 390 | 450 | 470 | 450 | 420 | 41 |

| Resin No. | | Curing Time, (sec.) | | | | | |
|---|---|---|---|---|---|---|---|
| | | 5 | 10 | 20 | 30 | 40 | 50 |
| R-11 | Avg. Wt. 3 Cores, gms | 107.0 | 108.0 | 107.0 | 108.1 | 107.5 | 108.0 |
| | Tensile strength, p.s.i | 180 | 300 | 380 | 520 | 550 | 580 |
| | | 210 | 300 | 420 | 520 | 550 | 550 |
| | | 180 | 270 | 390 | 490 | 510 | 530 |
| | Average | 190 | 290 | 397 | 510 | 537 | 552 |
| R-12 | Avg. Wt. 3 Cores, gms | 107.3 | 106.4 | 107.0 | 106.4 | 107.2 | 106.3 |
| | Tensile strength, p.s.i | 240 | 410 | 550 | 550 | 510 | 510 |
| | | 260 | 450 | 540 | 550 | 550 | 510 |
| | | 250 | 400 | 500 | 530 | 500 | 480 |
| | Average | 250 | 420 | 530 | 543 | 520 | 500 |
| | Control R-1 from Example I: Avg. Wt. 3 Cores, gms | 105.7 | 107.0 | 106.0 | 106.5 | 106.0 | 106.5 |
| | Tensile strength, p.s.i | 210 | 420 | 480 | 560 | 530 | 520 |
| | | 200 | 460 | 550 | 530 | 560 | 540 |
| | | 270 | 450 | 500 | 540 | 590 | 550 |
| | Average | 227 | 443 | 510 | 543 | 560 | 537 |

*Example VI*

A resinous binder in which the relative concentrations of the three principal ingredients fall within the concentration area represented by the double hatched area of FIGURE 2 of the drawings was prepared and tested with a somewhat different catalyst formulation. This binder, hereinafter referred to as R-13, was prepared from the following materials:

| Concentrate of Example I: | Parts by weight |
|---|---|
| Formaldehyde | 900.00 |
| Urea | 375.00 |
| Additional urea | 375.00 |
| Total urea | 750.00 |
| Furfuryl alcohol | 1200.00 |

Acetic acid—to a pH of 5.7 before cooking.
Triethanolamine—to a pH of 7.0 after cooking.

This resinous material was processed to a viscosity of about 350 centipoises.

A liquid catalyst, hereinafter referred to as catalyst C-2, was prepared from the following materials:

| | Parts by weight |
|---|---|
| Urea | 778 |
| Aqueous HCl (37–38%) | 331 |
| Additional water | 208 |
| $NH_4NO_3$ | 19 |

This catalyst solution was processed in the same manner as catalyst C-1 to a pH of about 7.

Test cores were prepared from R-13, C-2 and sand (AFS 46) and tested for tensile strength as in the preceding examples using pattern temperature of 425° F. and 80 p.s.i. blowing pressure. The results of these tests were as follows:

*Example VII*

Core binder resins were prepared as in the preceding examples except that the relative concentrations of the three principle ingredients were adjusted to fall slightly outside the limits of the concentrations illustrated by the hatched area of FIGURE 1, in these instances in areas representative of reduced formaldehyde content.

One such binder, hereinafter referred to as "R-14," was prepared from the following materials:

| Concentrate of Example I: | Parts by weight |
|---|---|
| Formaldehyde | 825.00 |
| Urea | 343.75 |
| Additional urea | 436.00 |
| Total urea | 779.75 |
| Furfuryl alcohol | 1050.00 |
| Acetic acid | 2.40 |
| Triethanolamine | 5.90 |
| Sorbitan trioleate | 29.00 |

This resinous maetrial was process to a pH of 7.05.

Another such binder, hereinafter referred to as "R-15," was prepared from the following materials:

| Concentrate of Example I: | Parts by weight |
|---|---|
| Formaldehyde | 787.80 |
| Urea | 328.25 |
| Additional urea | 339.00 |
| Total urea | 667.25 |
| Furfuryl alcohol | 1200.00 |
| Acetic acid | 2.60 |
| Triethanolamine | 6.80 |
| Sorbitan trioleate | 29.00 |

This resinous material was processed to a pH of 7.

| | Curing Time (sec.) | | | | | |
|---|---|---|---|---|---|---|
| | 5 | 10 | 20 | 30 | 40 | 50 |
| Wt. Avg. 3 Cores, gms | 104.9 | 105.5 | 105.0 | 105.6 | 105.3 | 105.8 |
| Tensile Strength Avg. 3 Cores, 1″ x 1″, p.s.i | 130 | 363 | 447 | 503 | 507 | 480 |

Another such binder, hereinafter referred to as "R–16," was prepared from the following materials:

| Concentrate of Example I: | Parts by weight |
|---|---|
| Formaldehyde | 625.20 |
| Urea | 260.50 |
| Additional urea | 389.00 |
| Total urea | 649.50 |
| Furfuryl alcohol | 938.00 |
| Acetic acid | 2.10 |
| Triethanolamine | 5.60 |
| Sorbitan trioleate | 24.00 |

This resinous material was processed to a pH of 7.1

Another such binder, hereinafter referred to as "R–17," was prepared from the following materials:

| Concentrate of Example I: | Parts by weight |
|---|---|
| Formaldehyde | 625.20 |
| Urea | 260.50 |
| Additional urea | 264.00 |
| Total urea | 524.50 |
| Furfuryl alcohol | 1063.00 |
| Acetic acid | 2.10 |
| Triethanolamine | 5.60 |

This resinous material was processed to a pH of about 7.

Cores were prepared as in the previous examples with the foregoing resins, catalyst C–1, and sand (AFS 46) and tested for tensile strength at the same curing times. The results of these tests were as follows:

methyl urea and guanidine, 1-cyano, are substituted for the urea components of the resin and catalyst.

*Example IX*

Resins of the type hereinbefore described which have a formaldehyde concentration greater than those shown within the hatched areas of FIGURES 1 and 2 have been found to be subject to premature set-up, commonly referred to as blocking. In this respect the resins having concentrations within the single hatched area of FIGURE 2 are recommended for use where the temperature for mixing and handling prior to core blowing is relatively low to moderate.

A number of the foregoing binder formulations were further tested to establish their relative resistance to premature set-up or blocking, i.e. significant polymerization during mixing and handling prior to exposure to the heated pattern. In these tests polymerization was accelerated by the use of temperatures substantially above normal temperatures for the mixing zone.

In these tests the core composition was prepared by admixing the sand, catalyst solution and resinous material in the same proportions employed for the foregoing tensile strength tests. The catalyst solution and the sand were first admixed for about 1 minute after which the resin was added and the mixing was continued for 3 minutes. A portion of the molding composition was rammed to produce 2″ x 2″ cylindrical specimens. This was effected by dropping a 14 lb. weight 2″ upon a measured amount of the composition. The cylindrical specimens were heated to 150° F. and checked for compres-

| Resin No. | | Curing Time (sec.) | | | | | |
|---|---|---|---|---|---|---|---|
| | | 5 | 10 | 20 | 30 | 40 | 50 |
| R–14 | Avg. Wt. 3 Cores, gms | 105.0 | 105.5 | 105.0 | 105.8 | 105.2 | 105.9 |
| | Tensile strength, p.s.i | 50 | 150 | 330 | 350 | 450 | 490 |
| | | 70 | 200 | 340 | 370 | 440 | 490 |
| | | 50 | 150 | 320 | 400 | 430 | 480 |
| | Average | 57 | 167 | 330 | 373 | 440 | 487 |
| R–15 | Avg. Wt. 3 Cores, gms | 106.3 | 107.0 | 106.7 | 107.2 | 106.7 | 107.4 |
| | Tensile strength, p.s.i | 100 | 200 | 300 | 430 | 480 | 570 |
| | | 120 | 210 | 350 | 400 | 500 | 550 |
| | | 100 | 200 | 330 | 400 | 450 | 520 |
| | Average | 107 | 203 | 327 | 410 | 477 | 547 |
| R–16 | Avg. Wt. 3 Cores, gms | 105.0 | 105.6 | 105.0 | 105.8 | 105.3 | 106.2 |
| | Tensile strength, p.s.i | (1) | 50 | 100 | 200 | 240 | 240 |
| | | | 50 | 130 | 170 | 260 | 270 |
| | | | 70 | 140 | 170 | 200 | 270 |
| | Average | | 57 | 123 | 180 | 233 | 260 |
| R–17 | Avg. Wt. 3 Cores, gms | 106.7 | 107.1 | 106.5 | 107.2 | 106.6 | 107.5 |
| | Tensile strength, p.s.i | 80 | 170 | 200 | 260 | 330 | 390 |
| | | 80 | 120 | 230 | 290 | 320 | 420 |
| | | 50 | 120 | 210 | 250 | 280 | 370 |
| | Average | 50 | 137 | 213 | 267 | 310 | 393 |

¹ No cure.

*Example VIII*

Core binder formulations are prepared and molds therefrom prepared using the materials and procedures of Example I except that in separate formulations other polymerizable organic nitrogenous compounds, i.e. thiourea, sion strength at 10-minute intervals until polymerization was essentially complete. The compression tests were made on a Dietert Universal Sand Strength Machine and the numerical values obtained represent the pressure in pounds per square inch required to break or collapse the cylindrical specimen. For the purposes of this test a reading of 5.0 is considered complete blocking. The results of these tests were as follows:

BLOCKING TEST AT 150° F.

| Resin No. | Compression Requirements in p.s.i. at Designated Time Intervals | | |
|---|---|---|---|
| | 10 min. | 20 min. | 30 min. |
| R-2 | 0.12 | 0.14 | 0.46 |
| R-3 | 0.14 | 0.16 | 0.44 |
| R-4 | 0.18 | 0.26 | 0.64 |
| R-5 | 0.14 | 0.18 | 1.48 |
| R-6 | 0.12 | 0.18 | 0.96 |
| R-7 | 0.14 | 0.26 | 0.80 |
| R-8 | 0.12 | 0.38 | 5.00 |
| R-9 | 0.12 | 0.46 | 5.00 |
| R-10 | 0.16 | 0.86 | 5.00 |
| R-11 | 0.16 | 0.32 | 1.12 |
| R-14 | 0.20 | 0.30 | 0.50 |
| R-15 | 0.14 | 0.16 | 0.18 |
| R-16 | 0.18 | 0.26 | 0.40 |
| R-17 | 0.16 | 0.20 | 0.2 |

Viscosity suitability limits urea concentration. The combined urea and formaldehyde requirements in turn influence the furfural alcohol concentrations in an effective three component system using these ingredients.

While the present invention, as to its objects and advantages, has been described herein as carried out in specific embodiments thereof, it is not desired to be limited thereby but it is intended to cover the invention broadly within the spirit and scope of the appended claims.

I claim:

1. A molding composition consisting essentially of particulate refractory material, a heat polymerizable resin formed by reacting together organic monomers consisting essentially of formaldehyde, furfuryl alcohol and an organic nitrogenous compound selected from the group consisting of urea and substituted ureas, and a heat-activatable polymerization catalyst having a pH of at least about 7 upon being introduced into said composition and consisting essentially of an aqueous solution of the product of heating hydrochloric acid in an excess of said nitrogenous compound until the pH of said product is at least about 7.

2. A molding composition in accordance with claim 1 wherein said resin has a viscosity in the range of about 50 to about 1400 centipoises.

3. A molding composition in accordance with claim 1 wherein about 1.7 to about 3.5 parts by weight of liquid binder material consisting of a major amount of said resin and a minor amount of said catalyst is combined with 100 parts by weight of said particulate refractory material.

4. A molding composition consisting essentially of particulate refractory material, a heat polymerizable resin formed by reacting together organic monomers consisting essentially of formaldehyde, furfuryl alcohol and urea, and a heat-activatable polymerization catalyst having a pH of at least about 7 upon being introduced into said composition and consisting essentially of an aqueous solution of the product of heating hydrochloric acid in an excess of urea until the pH of said product is at least about 7.

5. A molding composition in accordance with claim 4 wherein said resin has a viscosity in the range of about 50 to about 600 centipoises.

6. A molding composition in accordance with claim 4 wherein the relative proportions of the total content of the formaldehyde, furfuryl alcohol and urea components of said composition fall within the hatched area of FIGURE 2.

7. A molding composition in accordance with claim 4 wherein the relative proportions of the total content of formaldehyde, furfuryl alcohol and urea components of said composition fall within the double hatched area of FIGURE 2.

8. A molding composition in accordance with claim 4 wherein said catalyst is an aqueous solution of the product of heating hydrochloric acid in an excess of urea at a temperature of at least about 259° F. until the pH of said product is at least about 7.

9. A molding composition in accordance with claim 4 containing a minor amount of a predominantly lipophilic compound having at least one hydrophilic functional group within its molecular structure.

10. A molding composition in accordance with claim 9 wherein said minor amount is within the range of about 0.1 to about 3.0 weight percent of said resin.

11. A method of producing a gas permeable foundry structure capable of retaining its shape while in contact with a cooling molten metal for a time sufficient for said metal to solidify to a shape retaining state, which method comprises forming a molding composition by admixing sand with a catalytic amount of a heat-activatable polymerization catalyst having a pH of at least about 7 upon being introduced into said composition and consisting essentially of an aqueous solution of the product of heating hydrochloric acid in an excess of urea until the pH of said product is at least about 7, admixing an essentially neutral heat polymerizable resin formed by reacting together organic monomers consisting essentially of formaldehyde, furfuryl alcohol and urea with said sand and said catalyst, and heating the resulting mixture in the range of about 350° F. to about 600° F.

References Cited

UNITED STATES PATENTS

| 2,869,195 | 1/1959 | Cooper et al. | 260—29.3 |
| 3,059,297 | 10/1962 | Dunn et al. | |
| 3,168,490 | 2/1965 | Brown et al. | 260—29.4 |
| 3,247,556 | 4/1966 | Buell et al. | 260—39 |

MURRAY TILLMAN, *Primary Examiner.*

J. C. BLEUTGE, *Assistant Examiner.*